United States Patent
Hyun

(10) Patent No.: US 10,264,773 B2
(45) Date of Patent: Apr. 23, 2019

(54) DRAG RELEASE SYSTEM FOR REEL

(71) Applicant: DOYO ENGINEERING CO., LTD., Bucheon (KR)

(72) Inventor: Kang Ho Hyun, Bucheon (KR)

(73) Assignee: DOYO ENGINEERING CO., LTD., Bucheon (KR)

( * ) Notice: Subject to any disclaimer, the term of this patent is extended or adjusted under 35 U.S.C. 154(b) by 0 days.

(21) Appl. No.: 15/809,330

(22) Filed: Nov. 10, 2017

(65) Prior Publication Data

US 2018/0132464 A1    May 17, 2018

(30) Foreign Application Priority Data

Nov. 11, 2016    (KR) .................. 10-2016-0150313

(51) Int. Cl.
  *A01K 89/01* (2006.01)
  *A01K 89/015* (2006.01)
  *A01K 89/033* (2006.01)

(52) U.S. Cl.
  CPC ...... *A01K 89/01907* (2015.05); *A01K 89/047* (2015.05)

(58) Field of Classification Search
  CPC .......... A01K 89/01907; A01K 89/0188; A01K 89/059
  See application file for complete search history.

(56) References Cited

U.S. PATENT DOCUMENTS

| | | | | | |
|---|---|---|---|---|---|
| 1,932,360 | A | * | 10/1933 | Adams | A01K 89/01907 242/314 |
| 2,146,582 | A | * | 2/1939 | Kohlhepp | A01K 89/033 242/268 |
| 2,162,774 | A | * | 6/1939 | Coxe | A01K 89/01907 242/260 |
| 5,071,086 | A | * | 12/1991 | Roberts | A01K 89/01907 242/268 |

FOREIGN PATENT DOCUMENTS

| | | |
|---|---|---|
| JP | 2015092830 | 5/2015 |
| KR | 20110019714 | 2/2011 |
| KR | 101193910 | 10/2012 |
| KR | 101607563 | 3/2016 |

* cited by examiner

*Primary Examiner* — Emmanuel M Marcelo
(74) *Attorney, Agent, or Firm* — Cantor Colburn LLP

(57) ABSTRACT

Provided is a drag release system of a reel, that system adjusting drag by rotation of a spool on the reel, more particularly, a drag release system that immediately adjusts drag of a spool to prevent cutting of a fishing line by immediately decreasing the drag of the spool when strong tension is applied to the spool during fishing, by forming a fitting hole perpendicular to the axis of a cylindrical driving shaft and forming slits at a sleeve fitted on the driving shaft to have a predetermined length in the longitudinal direction of the driving shaft and to correspond to the fitting hole so that a fixing pin fitted in the fitting hole through the slits prevents the sleeve from idling on the driving shaft and guides the sleeve when the drag is adjusted.

4 Claims, 4 Drawing Sheets

DRAG RELEASE SYSTEM FOR REEL

CROSS REFERENCE TO RELATED APPLICATION

The present application claims priority to Korean Patent Application No. 10-2016-0150313, filed Nov. 11, 2016 the entire contents of which is incorporated herein for all purposes by this reference.

BACKGROUND OF THE INVENTION

Field of the Invention

The present invention relates to a drag release system of a reel, that system adjusting drag by rotation of a spool on the reel. More particularly, the present invention relates to a drag release system that immediately adjusts drag of a spool to prevent cutting of a fishing line by immediately decreasing the drag of the spool when strong tension is applied to the spool during fishing, by forming a fitting hole perpendicular to the axis of a cylindrical driving shaft and forming slits at a sleeve fitted on the driving shaft to have a predetermined length in the longitudinal direction of the driving shaft and to correspond to the fitting hole so that a fixing pin fitted in the fitting hole through the slits prevents the sleeve from idling on the driving shaft and guides the sleeve when the drag is adjusted.

Description of the Related Art

In general, users, when fishing, increase or decrease drag of a spool, depending on the strength of the fishing line wound on the spool. The part used for adjusting the drag of a spool is called a drag release system.

Users generally adjust the drag of a spool in advance to correspond to the strength of their fishing lines using such a drag release system before casting.

When a fish that is stronger than the strength of a fishing line is hooked during fishing, problems such as cutting of the fishing line may be generated unless the user decreases the drag of a spool to cope with this situation.

That is, during fishing, if a fish hooked on a fishing line pulls the fishing line with a force larger than the strength of the fishing line, a spool is supposed to rotate to unwind the fishing line at appropriate speed and pressure. However, if the drag of the spool is too strong, the spool cannot be rotated, so the fishing line is cut.

In this case, the user can decrease the drag of the spool to using such a drag release system.

However, tension is applied even to the spool having the fishing line wound thereon by a fish during fishing, but the drag release system of the related art cannot quickly respond for its structure, so the drag is not reduced and the fishing line is easily cut.

In detail, technologies of adjusting the drag of a spool by adjusting contact pressure between a drag washer and a brake washer through an adjuster have been disclosed in Korean Patent Nos. 10-1607563 and 10-1193910.

According to these technologies, when the adjuster is released during fishing, a sleeve is moved toward a handle by the adjuster and the pressure on the washers is reduced, whereby the drag of a spool is supposed to be decreased.

However, the tension on the spool is applied in the rotational direction of the sleeve and the drag washer due to a D-cut coupling structure for preventing idling among a driving shaft of the handle, the drag washer, and the sleeve, so the sleeve cannot move toward the handle, whereby the drag of the spool is not reduced.

Accordingly, even if a user actively deals with situations by manually operating the drag release system, the drag release system is not easily operated, resulting in cutting of the fishing line.

DOCUMENTS OF RELATED ART (Patent document 1) Korean Patent No. 10-1607563
(Patent document 2) Korean Patent No. 10-1193910

SUMMARY OF THE INVENTION

The present invention has been made in an effort to solve the problems and an object of the present invention is to provide a drag release system of a reel, the system allowing a user to adjust the drag of the spool, depending on circumstances in order to prevent cutting of a fishing line due to excessive drag by including: a handle which includes a cylindrical driving shaft and a sleeve that are rotated together: and a sleeve that immediately moves when an adjuster is operated during fishing, thereby forming a fitting hole perpendicular to the axis of the driving shaft and forming slits at the sleeve fitted on the driving shaft to have a predetermined length in the longitudinal direction of the driving shaft and to correspond to the fitting hole so that a fixing pin fitted in the fitting hole through the slits couples the sleeve to the driving shaft, prevents the sleeve from idling on the driving shaft, and guides the sleeve when the drag is adjusted.

Further, an object of the present invention is to provide a drag release system of a reel, in which a drag adjustment assembly includes drag washers operating together with a driving shaft to easily adjust drag, that is, braking force of a spool, and braking washers not operating together with the driving shaft, all of the drag washers are fitted in side-cut portions of the driving shaft, or only the outermost first drag washer is fitted in the side-cut portions of the driving shaft and other driving shafts are coupled to the side-cut portions through a fixing bushing fitted in the side-cut portions such that the coupling structure of the sleeve and the drag washers are changed to fit to the number of the washers.

A drag release system for adjusting drag by rotation of a spool on a reel includes: a handle including a driving shaft rotating the spool, grips coupled to an outer end of the driving shaft, and a drag adjustment assembly including a plurality of washers disposed on an inner end of the driving shaft; an adjuster being movable axially on the driving shaft; and a sleeve fitted on the driving shaft between the drag adjustment assembly and the adjuster and adjusting the drag by rotation of the spool by tightening or loosening the drag adjustment assembly axially on the driving shaft when the adjuster is moved, in which the driving shaft is formed in a cylindrical shape having a circular outer side and has a fitting hole formed therethrough perpendicular to an axis thereof, the sleeve has slits formed at the inner end thereof perpendicular to the thereof to have a predetermined length in an axial direction of the driving shaft and correspond to the fitting hole, and the sleeve is coupled to and rotated together with the driving shaft by a fixing pin fitted in the fitting hole through the slits.

The sleeve may have non-circular side-cut portions formed by partially cutting a side or both sides of each of slits, and the drag adjustment assembly may include a drag washer fitted to the side-cut portions to operate with the sleeve and braking washers disposed on a side or both side of the drag washer to rotate around the side-cut portions without operating together with the sleeve.

The drag adjustment assembly may include a plurality of drag washers, and the side-cut portions may be fitted in all of the drag washers.

The drag adjustment assembly may include a plurality of drag washers, the side-cut portions may be fitted in only a first drag washer disposed at the outermost side of the drag adjustment assembly, and the other second drag washer disposed inside the drag adjustment assembly may be coupled to the side-cut portions through a fixing bushing fitted on a the side-cut portions to operate with the sleeve.

Since the drag release system of a reel of the present invention employs a cylindrical driving shaft that can operate with a sleeve and drag washers without idling, it is not required to machine a D-cut throughout on the entire driving shaft, so it is possible to reduce the manufacturing costs and improve concentricity.

Further, since the sleeve can be easily moved by the cylindrical driving shaft, the fixing pin, and the slits, it is possible to adjust drag using the adjuster even if tension is applied to the spool during fishing. Further, when the user operates the adjuster, since the drag is immediately and quickly adjusted, it is possible to prevent cutting of a fishing line due to excessive drag.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
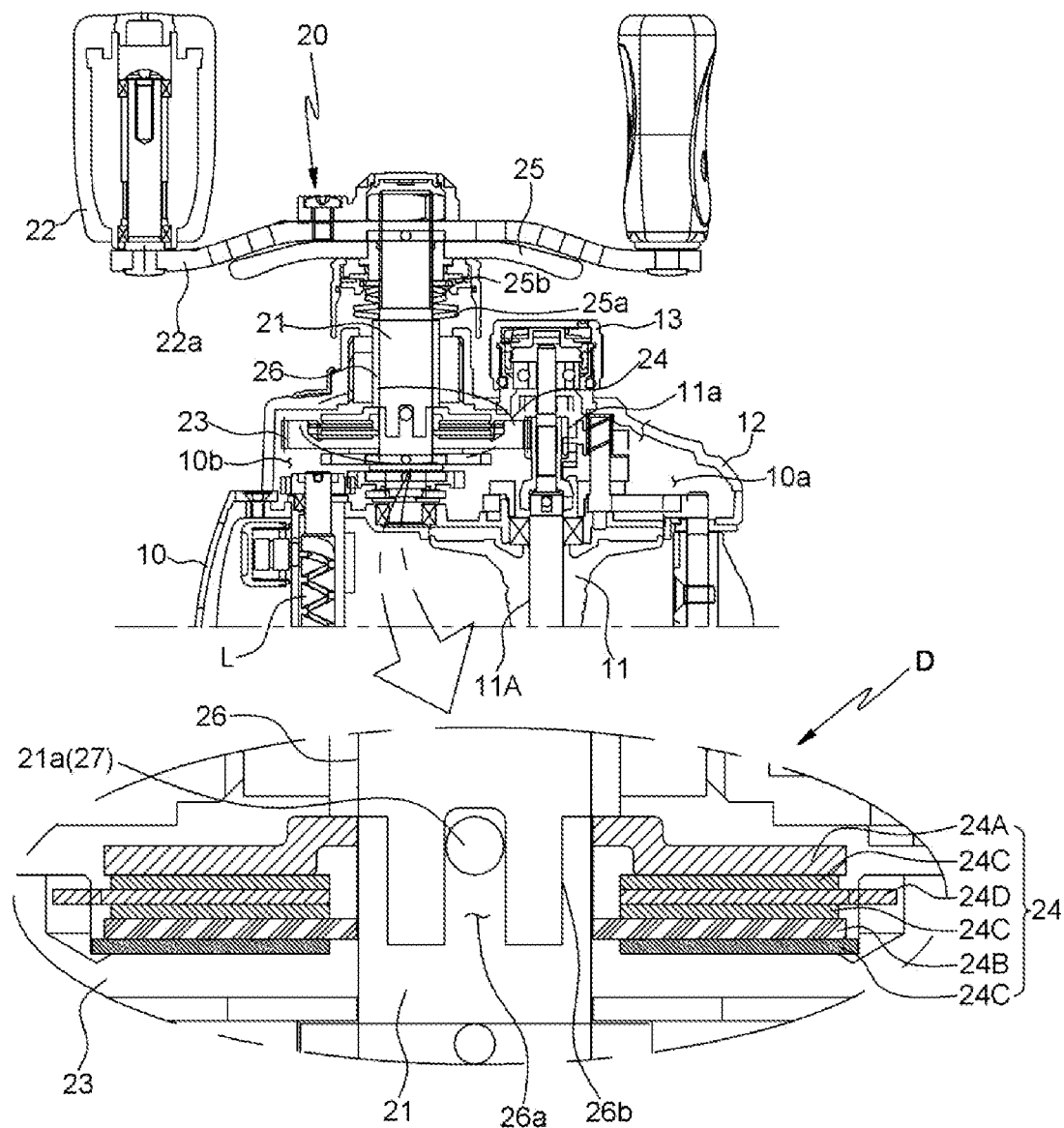
FIG. 1 is a partial cross-sectional view showing a first embodiment of the present invention.

The present invention may be modified in various ways and may have various embodiments, and aspects (or embodiments) will now be described in detail. The present invention may, however, be embodied in many different forms and should not be construed as being limited to only the embodiments set forth herein, but should be construed as covering modifications, equivalents or alternatives falling within ideas and technical scopes of the present invention.

In the figures, like reference numerals, particularly, reference numerals having the same last two digits or the same last two digits and letters refer to like elements having like functions throughout, and unless the context clearly indicates otherwise, elements referred to by reference numerals of the drawings should be understood based on this standard.

Also, for convenience of understanding of the elements, in the figures, sizes or thicknesses may be exaggerated to be large (or thick), may be expressed to be small (or thin) or may be simplified for clarity of illustration, but due to this, the protective scope of the present invention should not be interpreted narrowly.

The terminologies used herein are for the purpose of describing particular aspects (or embodiments) only and are not intended to be limiting of the present invention. As used herein, the singular forms are intended to include the plural forms as well, unless the context clearly indicates otherwise.

It will be further understood that the terms "comprises,", "comprising,", "includes", and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

Terms such as 'a first ~' and 'a second ~' are used only for the purpose for distinguishing a constitutive element from other constitutive elements, but constitutive elements should not be limited to a manufacturing order, and the terms described in the detailed description of the invention may not be consistent with those described in the claims.

In the following description of a drag release system for a reel according to the present invention, directions are first defined not definitely, but approximately with reference to FIGS. 1 and 3 for the convenience of description, that is, the gravity direction is defined as the downward direction and 'up, 'down', 'left', and 'right' are defined as they are seen. Further, 'top' and 'outside', and 'down' and 'inside' may have the same meanings, respectively, and this definition is applied in the same way to description related to other figures and claims unless specifically stated.

Hereinafter, a drag release system for a reel according to the present invention is described with reference to the accompanying drawings.

Figure 2:
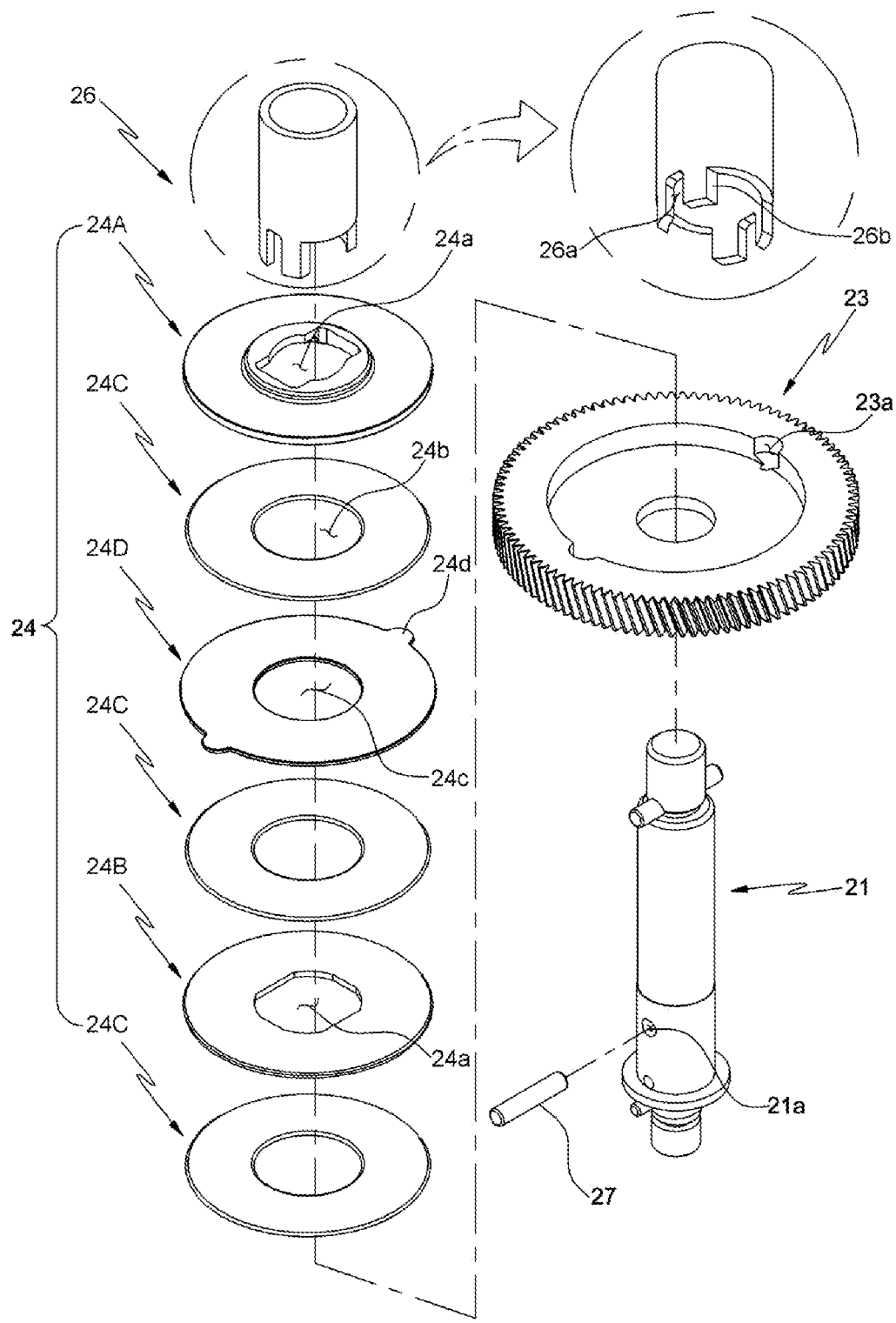
FIG. 2 is an exploded perspective view showing only main part of the first embodiment of the present invention.
Figure 3:
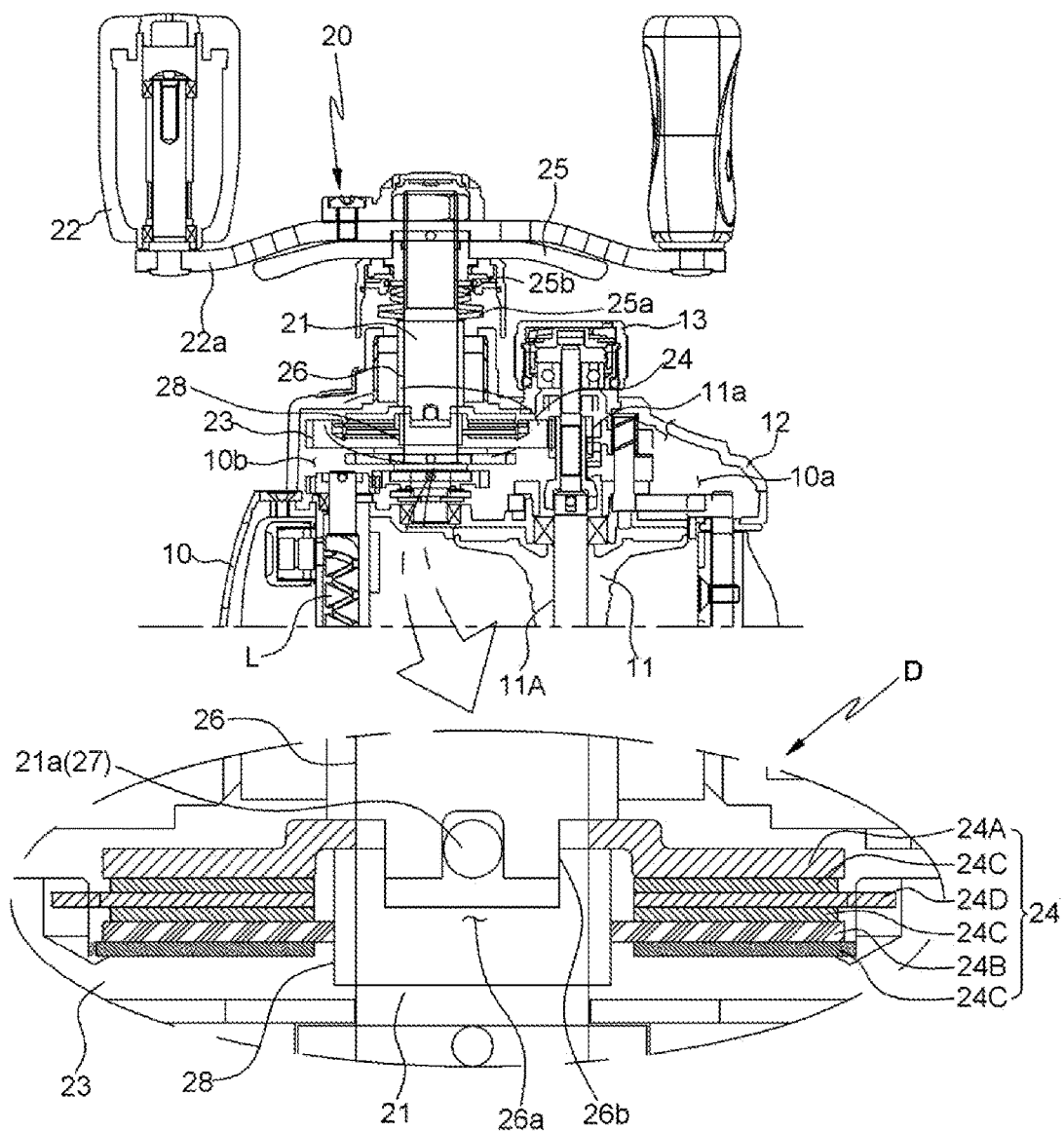
FIG. 3 is a partial cross-sectional view showing a second embodiment of the present invention.
Figure 4:
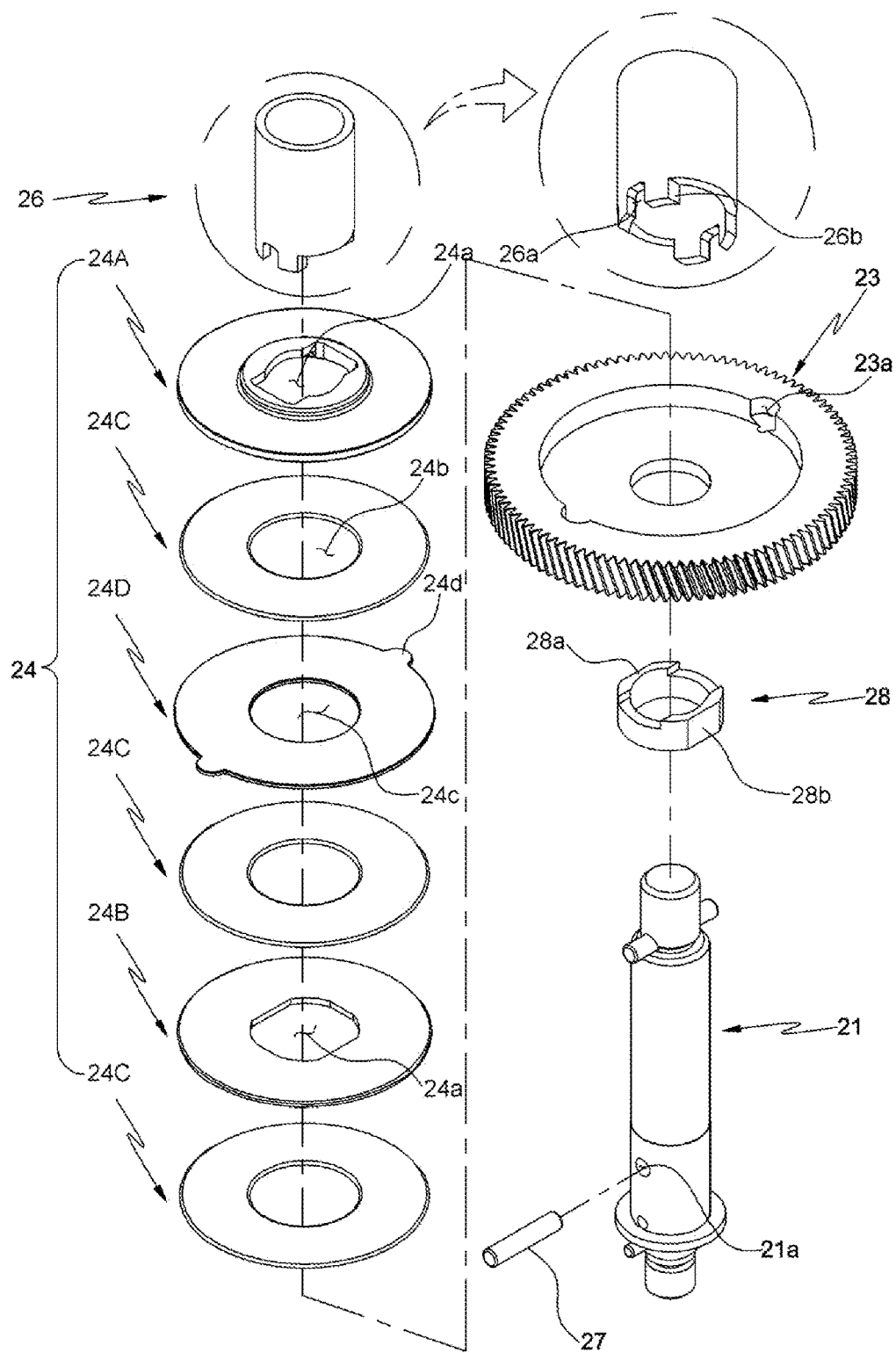
FIG. 4 is an exploded perspective view showing only main part of the second embodiment of the present invention.

As shown in FIGS. 1 and 3 showing cross-sections of a part of each of embodiments of the present invention (a driving shaft 21 and a sleeve 26 are shown not in cross-sectional view, but in plan views with projective external appearances) and FIGS. 2 and 4 which are partial exploded perspective views showing only main parts of the present invention, The present invention relates to a drag release system for a reel for adjusting drag based on rotation of a spool 11 on a reel and generally includes a frame 10, a handle 20, and a drag assembly D.

A spool 11 for winding a fishing line is mounted on a first mount 10*a* of the frame 10 and a handle 20 having the drag assembly D is mounted on a second mount 10*b*.

The spool 11 is coupled to the frame 10 through a spool shaft 11A and a casting distance is adjusted by a tension nut 13 disposed at the handle 20.

The spool 11 has a driven gear 11*a* and is connected with a drive gear 23 fitted on a driving shaft 21 of the handle 20, so when the handle 20 is operated, the spool 11 is rotated to wind a fishing line.

The handle 20, which is provided to wind the fishing line by rotating the spool 11, includes the driving shaft 21 for rotating the spool 11, grips 22 coupled to the outer end of the driving shaft 21, and a drag adjustment assembly 24 including a plurality of washers 24A to 24D fitted on the inner end of the driving shaft 21.

The drive gear 23 fitted on the inner end of the driving shaft 21 is in mesh with a driven gear 11a of the spool 11, so the driving shaft 21 can rotate the spool 11.

The drag assembly D includes a drag adjuster 24 fitted on the inner end of the driving shaft 21 outside the drive gear 23, an adjuster 25 fitted on the outer end of the driving shaft 21 inside the handle 20, and a sleeve 26 disposed between the drag adjustment assembly 24 and the adjuster 25.

The handle 20 is operated through a handle bar 22a coupled to the outer end of the driving shaft 21 and any one of the grips 22 coupled to both ends of the handle bar 22a.

The handle 20 may be changed in the left and right structures as a left handle or a right handle (only the right handle structure is shown in the figures) and when the spool 11 is rotated by the handle 20, the operation for winding the fishing line is performed.

The adjuster 25 is disposed at the outer end of the driving shaft 21 to be movable (forward/backward) axially on the driving shaft 21.

When the adjuster 25 is moved, the elasticity of an elastic member elastically supporting the sleeve 26 is changed, so the sleeve 26 is moved (forward/backward) axially on the driving shaft 21 together with the adjuster 25.

The elastic member that elastically transmits pressure by movement of the adjuster 25 to the drag adjustment assembly 24 is coupled to the adjuster 25.

A drum type medium transmitting force of the spring washers in avoidance of interference by the hollow portion of a cover of the frame is first coupled.

Next, a set of two high-elastic spring washers 25a that are composite spring washers for configuring an elastic member is provided and then a set of two low-elastic spring washers 25b is provided.

Accordingly, the elasticity of the elastic member is transmitted to the sleeve 26 as the adjuster 25 is moved forward/backward.

The adjuster 25 is generally thread-fastened to the driving shaft 21 and moved forward/backward axially on the driving shaft 21 by rotating. Alternatively, in order to avoid the spirit and the scope of the present invention or unavoidably, the adjuster 25 may be thread-fastened to a male tread (or female tread) formed on other components such as the frame 10 to move forward/backward by rotating.

The sleeve 26 adjusts drag according to rotation of the spool 11 by axially contracting or releasing the drag adjustment assembly 24 axially on the driving shaft 21 when the adjuster 25 is moved forward/backward.

The sleeve 26 has non-circular side cut-portions 26b formed by partially cutting a side or both sides of each of slits 26a to be described below so that the drag washers 24A and 24B of the drag adjustment assembly 24 are rotated together with the driving shaft 21 without idling on the driving shaft 21.

The drag adjustment assembly 24 includes the drag washers 24A and 24B rotating together with the driving shaft 21 and braking washers 24C idling without rotating with the driving shaft 21.

As the sleeve 26 increases or decreases the force pressing the drag washers 24A and 24B, the degree of contact between the drag washers 24A and 24B and the braking washers 24C is changed, where by braking force by friction, that is, the drag of the spool 11 is determined.

The braking washers 24C are disposed on a side or both side of each of the drag washers 24A and 24B and the number of braking washers 24C may depend on the number of drag washers 24A and 24B.

The numbers of the drag washers 24A and 24B and the braking washers 24C are not limited, but two or more drag washers 24A and 24b and braking washers 24C may be alternately arranged to stably and immediately secure drag of the spool 11.

FIGS. 1 to 4 show a representative structure having a total of six washers for the drag adjustment assembly 24.

In detail, the drag adjustment assembly 24 includes, sequentially from the inside, a braking washer 24C, a drag washer 24B, a braking washer 24C, an interlock washer 24D, a braking washer 24C, and a drag washer 24A.

In more detail, the drag washers 24A and 24B have a non-circular hole 24a corresponding to the shapes of the side-cut portions 26b and are fixed to the side-cut portions 26b to rotate together with the sleeve 26.

The braking washers 24C have a circular hole 24b larger than outer diameter of the sleeve 26 and disposed rotatably about the side cut-portions 26b, only the braking washers 24C idle regardless of the sleeve 26.

The interlock washer 24D, similar to the braking washers 24C, has a circular hole 24c and idles around the side-cut portions 26b.

In particular, the interlock washer 24D disposed between the braking washers 24C at the middle has interlock projections 24d formed on the outer side to be locked in locking grooves 23a formed on the inner side of the drive gear 23 to rotate together with the driver gear 23.

In the first drag washer 24A at the outermost side of the drag adjustment assembly 24, the non-circular hole 24a is curved to protrude outward, so locking portions 28a of a fixing bushing 28 to be described below are seated in the internal space formed in this way.

The washers 24A to 24D arranged in the axial direction of the driving shaft 21 are pressed to each other by the elasticity of the elastic member applied through the sleeve 26.

Accordingly, when a fish bites a hook and a fishing line is unwound from the spool 11 during fishing, rotational pressure applied to the spool 11 is transmitted to the drive gear 23 through the driven gear 11a.

Accordingly, the drag washers 24A and 24B and the interlock washer 24D pressed by the sleeve 26 are rotated together with the driving shaft 21, while the braking washers 24C are not rotated on the driving shaft 21, so a braking function of the spool 11, that is, drag of the spool 11 is generated by friction between the washers 24A to 24D.

Accordingly, when a user adjusts the pressure on the drag adjustment assembly 24 by moving forward/backward the sleeve 26 through the adjuster 25 before starting fishing, the degrees of contact of the washers 24A to 24D are changed and the drag of the spool 1 is increased or decreased.

As described above, in order to reduce the drag of the spool 11 with tension applied to the spool 11, when a user loosens the adjuster 25, the sleeve 26 is lifted outside and pressure on the drag adjustment assembly 24 is reduced, so the drag of the spool 11 is supposed to be decreased.

However, a driving shaft of the related art has a D-cut type non-circular machined portion, that is, an anti-idling portion formed axially throughout the driving shaft to rotate the sleeve 26 and the driving shaft 21 together and the sleeve of the related art is formed in a D-shape corresponding to the anti-idling portion, so the driving shaft and the sleeve are skewed by the tension applied in the rotational direction to a fishing line and the sleeve is not lifted. Accordingly, drag is not substantially reduced despite of operation of the adjuster, so a fishing line is cut due to the fail to adjust the drag.

Accordingly, the present invention changes the entire shape of the driving shaft 21 and the sleeve 26 and the interlock structure to solve this problem.

First, the driving shaft 21 of the present invention is formed in a cylindrical shape having circular outer side without a D-cut type anti-idling portion of the driving shaft of the related art.

Further, the driving shaft 21 has a fitting hole 21a formed perpendicular to the axis through the driving shaft so that the sleeve 26 fitted on the middle of the driving shaft 21 is rotated together with the driving shaft 21.

Further, the sleeve 26 has the slits 26a formed at the inner end thereof perpendicular to the axis thereof to have a predetermined length in the axial direction of the driving shaft 21 and to correspond to the fitting hole 21a, so the sleeve 26 is combined and rotated with the driving shaft 21 by a fixing pin 27 fitted in the fitting hole 21a through the slits 26.

That is, the sleeve 26 and the driving shaft 21 are locked to each other by the fixing pin 27, so they are rotated together without idling.

When the adjuster 25 is operated, the sleeve 26 is guided on the fixing pin 27 in the axial direction of the driving shaft 21, so the drag is increased/decreased, depending on the change in pressure applied to the drag adjustment assembly 24.

Accordingly, since the driving shaft 21 and the sleeve 26 are not skewed due to their circular structures and the slits 26a can slide on the fixing pin 27, even if the adjuster 25 is loosened with tension applied to the spool 11 through a fishing line, the sleeve 26 reduces the pressure applied to the drag adjustment assembly 24 by moving up through immediate correspondence. Therefore, drag by rotation of the spool 11 is immediately reduced and the fishing line is unwound at an appropriate speed and pressure, thereby preventing cutting of the fishing line.

The drag release system including the driving shaft 21 and the sleeve 26 is implemented as different embodiments in terms of the details, depending on whether the drag washers 24A and 24B are combined only by the side-cut portions 26b of the sleeve 26 or combined by the separate fixing bushing 28 in addition to the side-cut portions 26b of the sleeve 26.

First, as shown in FIGS. 1 and 2 showing the first embodiment of the present invention, the side-cut portions 26b are fitted in all of the drag washers 24A and 24B of the drag adjustment assembly 24.

That is, the side-cut portions 26b are relatively much elongated to fit to the entire thickness of the drag adjustment assembly 24 due to the arrangement of the washers so that the side-cut portions 26b are fully inserted in all of the washers of the drag adjustment assembly 24 and all of the drag washers 24A and 24B are fitted in the side-cut portions 26b to rotate together with the sleeve 26.

The first embodiment is used when there are relatively less drag washers 24A and 24B, and in this case, it is possible to make assemblage convenient, reduce the manufacturing cost, and simplify the internal structure by reducing the number of parts.

Next, as shown in FIGS. 3 and 4 showing the second embodiment of the present invention, the side-cut portions 26b are fitted in only the first drag washer 24A at the outermost side of the drag adjustment assembly 24.

The other second drag washer 24B inside the drag adjustment assembly 24 is coupled to the side-cut portions 26b through the fixing bushing 28 fitted in the side-cut portions 26b to operate with the sleeve 26.

That is, the side-cut portions 26 are relatively decreased in length regardless of the entire thickness of the drag adjustment assembly 24 by the arrangement of the washers and the side-cut portions 26b are fitted only in the first drag washer 24A, so the first drag washer 24A is locked to the side-cut portions 26b and rotated together with the sleeve 26.

Further, the fixing bushing 28 is fitted in the side-cut portions 26b through the other washers, so the other second drag washer 24B is locked to the fixing pushing 28 and rotated together with the sleeve 26.

The fixing bushing 28 has the locking portions 28a corresponding to the side-cut portions 26b, so the fixing bushing 28 fitted in the side-cut portions 26b is rotated with the sleeve 26 with the locking portions 28a alternately fitted in the side-cut portions 26b.

Since the locking portions 28a corresponding to the shape of the non-circular hole 24a are formed on the outer side of the fixing pushing 28, the other second drag washer 24B locked to the fixing pushing 28 is rotated with the fixing pushing 28, that is, the sleeve 26.

According to the second embodiment, the side-cut portions 26b are shorter than those of the first embodiment, so the second embodiment is used when there are relatively many drag washers 24A and 24B, and in this case, it is possible to prevent damage due to reduction of the strength of the relatively long side-cut portions 26b.

Since the present invention employs the drag release system having the configuration described above, it is possible to immediately adjust (reduce) drag using the adjuster 25 even tension applied to the spool 11 through a fishing line. Further, it is possible to improve rotational balance by securing concentricity through the circular structures of the driving shaft 21 and the sleeve 26. Further, there is no need for machining a D-cut on a driving shaft 21 and a D-shape on the sleeve 26, so it is possible to increase the strength of the parts and reduce the machining costs.

Although a drag release system for a reel which has a specific shape and structure was described above with reference to the accompanying drawing, the present invention may be changed and modified in various ways by those skilled in the art and those changes and modifications should be construed as being included in the scope of the present invention.

What is claimed is:

1. A drag release system for adjusting drag by rotation of a spool on a reel, the system comprising:
   a handle including a driving shaft rotating the spool, grips coupled to an outer end of the driving shaft, and a drag adjustment assembly including a plurality of washers disposed on an inner end of the driving shaft;
   an adjuster being movable axially on the driving shaft; and
   a sleeve fitted on the driving shaft between the drag adjustment assembly and the adjuster and adjusting the drag by rotation of the spool by tightening or loosening the drag adjustment assembly axially on the driving shaft when the adjuster is moved,
   wherein the driving shaft is formed in a cylindrical shape having a circular outer side and has a fitting hole formed therethrough perpendicular to an axis thereof,
   the sleeve has slits formed at the inner end thereof perpendicular to an axis thereof to have a predetermined length in an axial direction of the driving shaft and correspond to the fitting hole, and
   the sleeve is coupled to and rotated together with the driving shaft by a fixing pin fitted in the fitting hole through the slits.

2. The system of claim 1, wherein the sleeve has non-circular side-cut portions formed by partially cutting a side or both sides of each of the slits, and the plurality of the washers includes drag washers fitted to the side-cut portions to operate with the sleeve and braking washers disposed on a side or both side of the drag washers to rotate around the side-cut portions without operating together with the sleeve.

3. The system of claim 2, wherein the side-cut portions are fitted in all of the drag washers.

4. The system of claim 2, wherein the drag washers include a first drag washer disposed at an outermost side of the drag adjustment assembly and a second drag washer disposed at an inner side of the drag adjustment assembly, the side-cut portions are fitted in the first drag washer, and the second drag washer is coupled to the side-cut portions through a fixing bushing fitted in the side-cut portions to operate with the sleeve.

\* \* \* \* \*